(12) United States Patent  
Baker et al.

(10) Patent No.: US 9,189,656 B1
(45) Date of Patent: Nov. 17, 2015

(54) IC CHIP PACKAGE DISABLING DEVICE

(71) Applicant: LENOVO ENTERPRISE SOLUTIONS (SINGAPORE) PTE. LTD., Singapore, SC (US)

(72) Inventors: Brian A. Baker, Raleigh, NC (US); William M. Megarity, Raleigh, NC (US); Luke D. Remis, Raleigh, NC (US); Christopher L. Wood, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/553,183

(22) Filed: Nov. 25, 2014

(51) Int. Cl.
*G01F 17/00* (2006.01)
*G06F 21/76* (2013.01)
*G06F 21/55* (2013.01)

(52) U.S. Cl.
CPC .............. *G06F 21/76* (2013.01); *G06F 21/554* (2013.01)

(58) Field of Classification Search
CPC ........ G06F 21/76; G06F 21/554; G06F 21/60
See application file for complete search history.

(56) References Cited

U.S. PATENT DOCUMENTS

| 3,860,835 | A | 1/1975 | Brymer et al. |
| 5,406,630 | A | 4/1995 | Piosenka et al. |
| 5,469,557 | A | 11/1995 | Salt et al. |
| 6,245,992 | B1 | 6/2001 | Hou |
| 6,273,339 | B1 | 8/2001 | Tuttle et al. |
| 6,608,792 | B2 * | 8/2003 | Pitts ........................ G11C 16/22 365/185.04 |
| 7,028,014 | B1 * | 4/2006 | Naclerio .......... G07B 17/00193 705/401 |
| 7,119,703 | B2 | 10/2006 | Sin |
| 7,490,250 | B2 | 2/2009 | Cromer et al. |
| 7,705,439 | B2 | 4/2010 | Pham et al. |
| 7,814,275 | B2 | 10/2010 | Lu et al. |
| 8,461,863 | B2 | 6/2013 | Pedersen et al. |
| 2002/0199111 | A1 | 12/2002 | Clark et al. |
| 2003/0174049 | A1 | 9/2003 | Beigel et al. |

OTHER PUBLICATIONS

Sliva et al., "Optical-based smart structures for tamper-indicating applications." Pacific Northwest National Laboratory, Nov. 1996, pp. 1-83.

* cited by examiner

*Primary Examiner* — Luan C Thai
(74) *Attorney, Agent, or Firm* — Law Office of Jim Boice

(57) ABSTRACT

A chip package comprises: an IC substrate, wherein the IC substrate comprises at least one electronic device; a photovoltaic cell, wherein the photovoltaic cell generates an electrical current when exposed to light; a light blocking shield, wherein the light blocking shield prevents light from striking the photovoltaic cell only while the chip package is mounted on a circuit board, and wherein the light blocking shield ceases to prevent light from striking the photovoltaic cell upon the chip package being dismounted from the circuit board; and a disabling logic, wherein the electrical current, which is generated by the photovoltaic cell in response to the chip package being dismounted from the circuit board, causes the disabling logic to disable the IC substrate.

20 Claims, 5 Drawing Sheets

IC CHIP PACKAGE DISABLING DEVICE

BACKGROUND

The present disclosure relates to the field of integrated circuits (ICs), and specifically to ICs packaged within chip packages. Still more particularly, the present disclosure relates to a device for disabling ICs within chip packages.

An integrated circuit (IC) is a set of electronic components, such as transistors, diodes, resistors, etc. on a small plate of semiconductor material, such as silicon. An IC, also called a "chip", is typically contained within a package of ceramic or plastic material known as a chip package (also called an "IC package" or an "IC chip package").

SUMMARY

In an embodiment of the present invention, a chip package comprises: an IC substrate, wherein the IC substrate comprises at least one electronic device; a photovoltaic cell, wherein the photovoltaic cell generates an electrical current when exposed to light; a light blocking shield, wherein the light blocking shield prevents light from striking the photovoltaic cell only while the chip package is mounted on a circuit board, and wherein the light blocking shield ceases to prevent light from striking the photovoltaic cell upon the chip package being dismounted from the circuit board; and a disabling logic, wherein the electrical current, which is generated by the photovoltaic cell in response to the chip package being dismounted from the circuit board, causes the disabling logic to disable the IC substrate.

In an embodiment of the present invention, a computer system comprises: a system bus; a chip package electrically coupled to the system bus, wherein the chip package comprises: an IC substrate, wherein the IC substrate comprises at least one electronic device; a photovoltaic cell, wherein the photovoltaic cell generates an electrical current when exposed to light; a light blocking shield, wherein the light blocking shield prevents light from striking the photovoltaic cell only while the chip package is mounted on a circuit board, and wherein the light blocking shield ceases to prevent light from striking the photovoltaic cell upon the chip package being dismounted from the circuit board; and a disabling logic, wherein the electrical current, which is generated by the photovoltaic cell in response to the chip package being dismounted from the circuit board, causes the disabling logic to disable the IC substrate.

In an embodiment of the present invention, a chip package comprises: an IC substrate, wherein the IC substrate comprises at least one electronic device; a disabling post assembly, wherein the disabling post assembly comprises: a post cap; a post connected to the post cap, wherein the post cap is connected to a first end of the post, wherein the post traverses through a post channel in the IC substrate, and wherein the post cap is initially positioned above the IC substrate; a post base connected to a second end of the post, wherein the post base is connected to a surface of a circuit board to which the chip package is electrically connected, wherein the post cap is physically pulled through the IC substrate while the chip package is subsequently removed from the circuit board, and wherein removing the chip package causes the post cap to physically destroy the IC substrate.

DETAILED DESCRIPTION

The present invention is directed to disabling IC chips if they are removed from a circuit board. For example, some government agencies require that all programmable parts on a server board be erased or secured before leaving their facility for either return or repair. If a server board does get out of the facility without this action being taken, chips could be removed from the board and read using a device reader/programmer. Thus, the present invention provides a layer of code security at the chip package level, either by using a photovoltaic cell that is activated when the chip package is removed from the server board, or by a physical post system that physically damages the chip inside the chip package when the chip package is removed from a circuit board, such that the contents of the chip package are unreadable and thus secure. Note that in one or more embodiments of the present invention, the IC chip (e.g., IC substrate 104/304 described below) is disabled by electricity generated by a photovoltaic cell, not by direct exposure to ultraviolet or other electromagnetic light shining on the elements of the IC chip itself.

Figure 1:
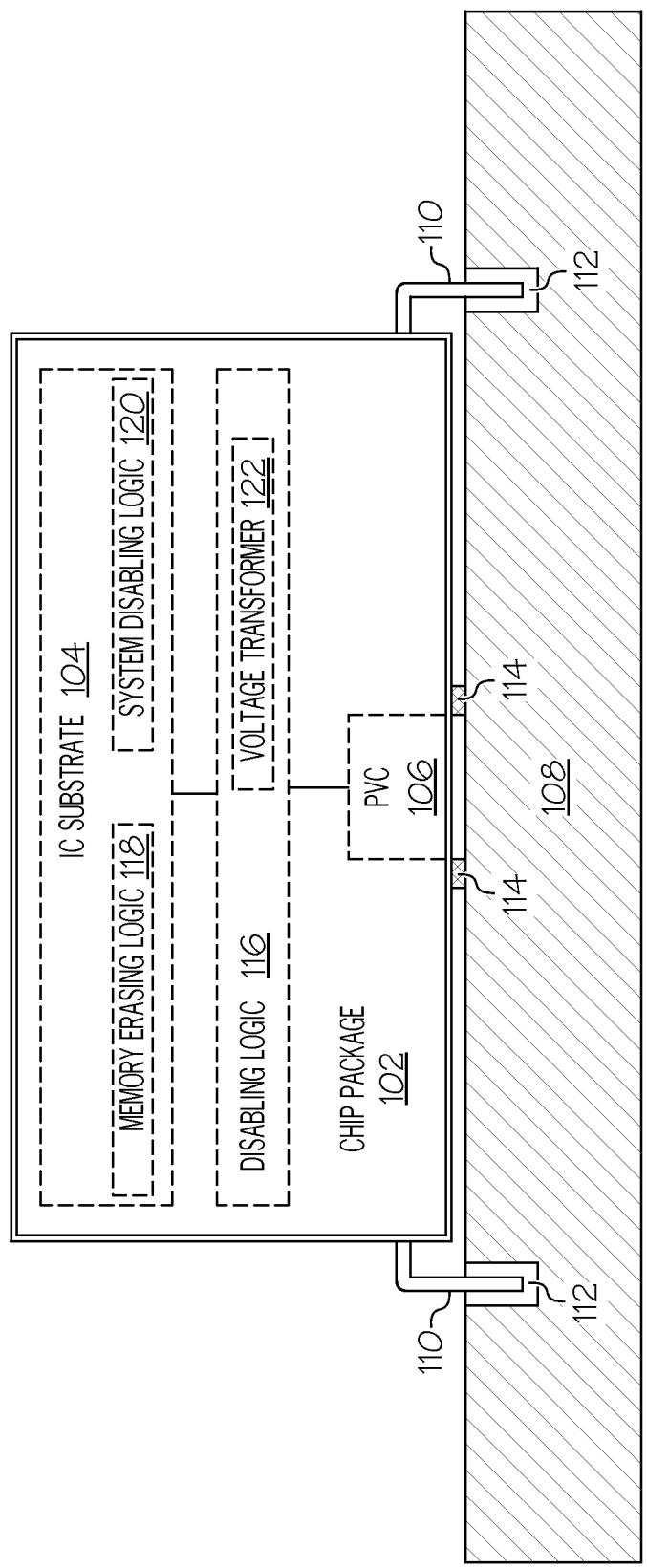
FIG. 1 depicts a chip package, which has a photovoltaic cell (PVC), mounted on a circuit board.

With reference now to the figures, and specifically to FIG. 1, an exemplary chip package 102, in accordance with one or more embodiments of the present invention, is presented. Chip package 102 is a chip package that is encased within a body made of ceramic, plastic, etc. Within the chip package 102 is an IC substrate 104. In various embodiments, IC substrate 104 (e.g., silicon) creates an IC circuit that has one or more electronic components, such as transistors, diodes, resistors, capacitors, induction coils, etc. Together these electronic components make up a processor, an application specific integrated circuit (ASIC), a memory (e.g., volatile memory such as a random access memory (RAM), or non-volatile memory such as a read only memory (ROM), a programmable read only memory (PROM), an erasable programmable read only memory (EPROM), an electrically erasable programmable read only memory (EEPROM), etc.).

As depicted in FIG. 1 and in an embodiment of the present invention, the chip package 102 includes a photovoltaic cell (PVC) 106. PVC 106 incorporates photodiodes that convert light into electrical current. As known to those skilled in the art, the photodiodes create an electron-hole pair upon being struck by photons, thus creating electricity according to a physics phenomenon known as the inner photoelectric effect.

As shown in FIG. 1, the chip package 102 is initially mounted on a circuit board 108. Electrical connections are made between the chip package 102 and its internal components (including, but not limited to, IC substrate 104) via pins 110 that are inserted into socket holes 112, which include electrically conductive linings that allow current to flow to circuitry (not shown) within the circuit board 108. The connection between the pins 110 and the socket holes 112 may be via mechanical clamping mechanisms (not shown), or by soldering the pints 110 to the socket holes 112. In the case of a ball grid array (BGA) device, this connection is made by melting the solder balls on the BGA directly onto the circuit board 108.

As depicted in FIG. 1, while the pins 110 are mated into the socket holes 112, thereby mounting the chip package 102 to the circuit board 108, the opening to the PVC 106 is blocked, thereby preventing light from reaching the photodiodes within the PVC 106 such that the PVC 106 produces no (or at least minimal) electricity. This light occlusion/blockage may be due to the close proximity between circuit board 108 and the chip package 102 while mated together (thereby blocking any ambient light), and/or the light occlusion/blockage may be enhanced by a light collar 114, which provides a circumferential barrier around the PVC 106. In an embodiment of the present invention, this light collar 114 is a cap that is affixed to either the bottom of the chip package 102 or to the top of the circuit board 108.

As depicted, the chip package 102 includes a disabling logic 116, a memory erasing logic 118, and/or a system disabling logic 120. In order to understand how these components work according to one or more embodiments of the present invention, reference is now made to FIG. 2, which illustrates the chip package 102 in FIG. 1 after it has been removed (decoupled) from the circuit board 108.

Figure 2:
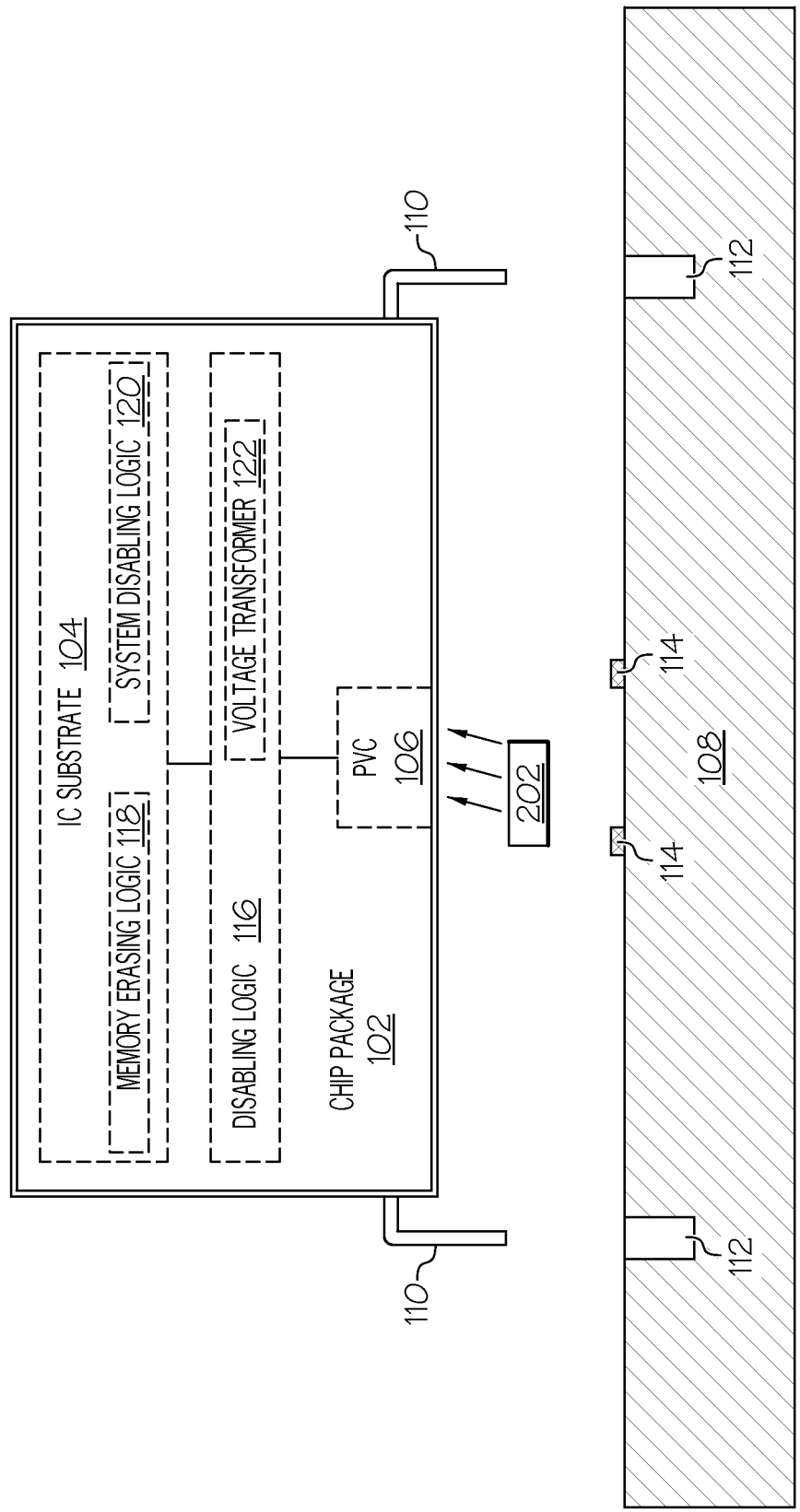
FIG. 2 illustrates the chip package in FIG. 1 after it has been removed from the circuit board.

As shown in FIG. 2, removing the chip package 102 from the circuit board 108 (e.g., by desoldering the pins 110 or otherwise disengaging pins 110 from socket holes 112) exposes the PVC 106 to an ambient light source 202, which may be ambient room lighting. When the ambient light source 202 strikes the photodiodes within the PVC 106, an electrical current is generated. This electrical current is sent to disabling logic 116.

In an embodiment of the present invention, disabling logic 116 transfers the current from the PVC 106 to the IC substrate 104. If the current/voltage is high enough (depending on the design of the PVC 106), this current/voltage/power will be enough to "fry" the circuitry within the IC substrate 104 (e.g., cause permanent damage by overloading the circuitry to the point of irrevocably damaging transistors, diode, etc.). However, if the PVC 106 does not produce adequate power to permanently damage the IC substrate 104, then a voltage transformer 122 within the disabling logic 116 will boost the voltage level to that which will permanently damage the IC substrate 104 by exceeding its voltage rating. For example, if the IC substrate 104 uses $5.0V_{DC}$, then pushing $25V_{DC}$ through the IC substrate 104 will cause irreversible damage to the IC substrate 104, thereby rendering the IC substrate 104 unusable.

In an embodiment of the present invention, the disabling logic 116 is logic that is more subtle in how it disables the IC substrate. In this embodiment, the disabling logic 116 is powered up by electricity from the PVC 106 (which is generated only when the chip package 102 is removed from the circuit board 108). This allows the disabling logic 116 to reconfigure, rather than "fry", the IC substrate 104 to the point that is it disabled. For example, assume that the IC substrate is an electrically erasable programmable read only memory (EEPROM). Power from the PVC 106 causes the disabling logic 116 to direct the memory erasing logic 118 to set a protection bit in the EEPROM. Initially, the EEPROM remains functionally intact, and data stored within the EEPROM is still present. However, when the chip package 102 is subsequently powered up (e.g., by being plugged into another circuit board), the protection bit directs the EEPROM to be erased, thus removing all data from the EEPROM. Thus, the power from the PVC 106 does not directly erase the contents of the EEPROM. Rather, the PVC 106 activates the disabling logic 116, which sets the protection bit for subsequent use.

In another embodiment of the present invention, assume that the IC substrate 104 is a processor. In this embodiment, the system disabling logic 120 prevents the processor from operating, both immediately upon being removed from the circuit board 108 and upon being reinstalled on another circuit board. In an embodiment of the present invention, the system disabling logic 120 is a power switch to the processor, which is permanently set to the "off" position (i.e., creates a permanent break in a power line between the IC substrate 104/processor and a power supply) by the power from the PVC 106. For example, the system disabling logic 120 may include a power fuse (not shown) that, when hit by power from the PVC 106, melts, thereby permanently preventing power from reaching the processor.

In another embodiment of the present invention, the system disabling logic 120 drives a voltage spike through the processor. As with the EEPROM described above, this voltage spike permanently disables the processor by permanently damaging (i.e., "frying") circuitry within the processor (e.g., by melting certain circuits, permanently "blowing" transistors by exceeding their voltage ratings, etc.). This voltage spike may be generated directly by the PVC 106 (if powerful enough), or it may be generated through the use of the voltage transformer 122 found in the disabling logic 116.

Thus, FIG. 1 and FIG. 2 depict a chip package that permanently disables a circuitry upon a photovoltaic cell being exposed to ambient light. One embodiment of the present invention is a chip package that comprises: an IC substrate (e.g., IC substrate 104). This IC substrate comprises at least one electronic device, such as a memory cell, a transistor, a diode, a resistor, a capacitor, an internal connection wiring, etc. A photovoltaic cell (e.g., PVC 106) within the chip package generates an electrical current when exposed to light and/or other light on the electromagnetic spectrum. A light blocking shield prevents light from striking the photovoltaic cell only while the chip package is mounted on a circuit board (e.g., circuit board 108), and the light blocking shield ceases to prevent light from striking the photovoltaic cell upon the chip package being dismounted from the circuit board. This light blocking shield may be effectuated just by the lack of space between the chip package and the circuit board while the chip package is mounted on the circuit board (thus preventing light from entering between the chip package and the circuit board), and/or the light blocking shield may be (or may be augmented by) a light collar (e.g., light collar 114).

Figure 3:
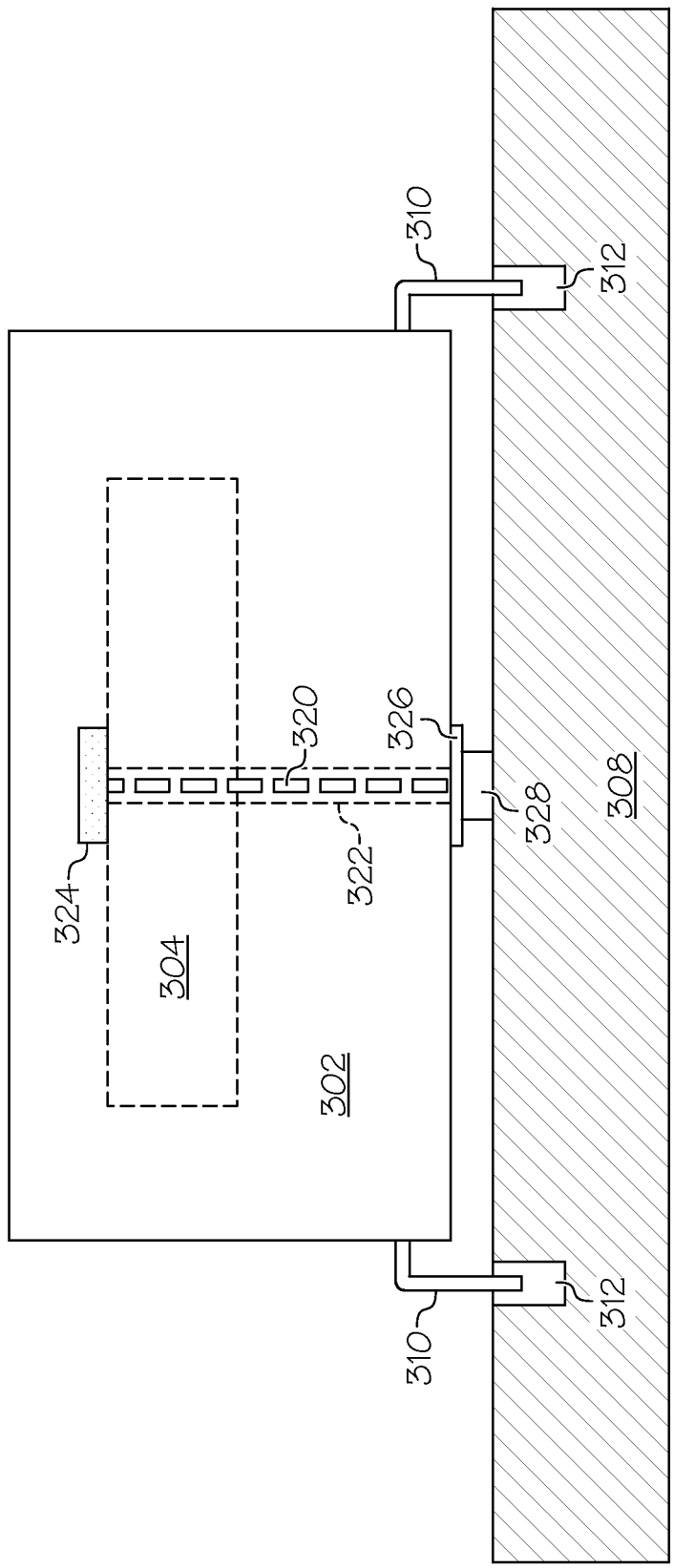
FIG. 3 depicts a chip package that has a disabling device that mechanically destroys an IC substrate within the chip package.

With reference now to FIG. 3, a chip package 302 that has a disabling device (i.e., a disabling post assembly) that mechanically destroys an IC substrate 304 within the chip package 302 is presented. As shown, the disabling device (disabling post assembly) includes a post 320, which traverses through a post channel 322 through the IC substrate 304. IC substrate 304 is analogous to the IC substrate 104 shown in FIG. 1, with the stipulation that the post channel 322 cuts through a section of the IC substrate 304 that has no useful circuitry, components, etc. Affixed to a first end of the post 320 is a post cap 324. Affixed to a second end of the post 320 is a post base 326. When the chip package 302 is mounted onto the circuit board 308 (e.g., by inserting pins 310 into socket holes 312), the post base 326 presses against an adhesive 328. This causes the post base 326 to be permanently affixed to the circuit board. In an alternative embodiment, the post base 326 locks into an interlocking dock (not shown), which preferably cannot be disengaged without damaging the chip package 302.

Figure 4:
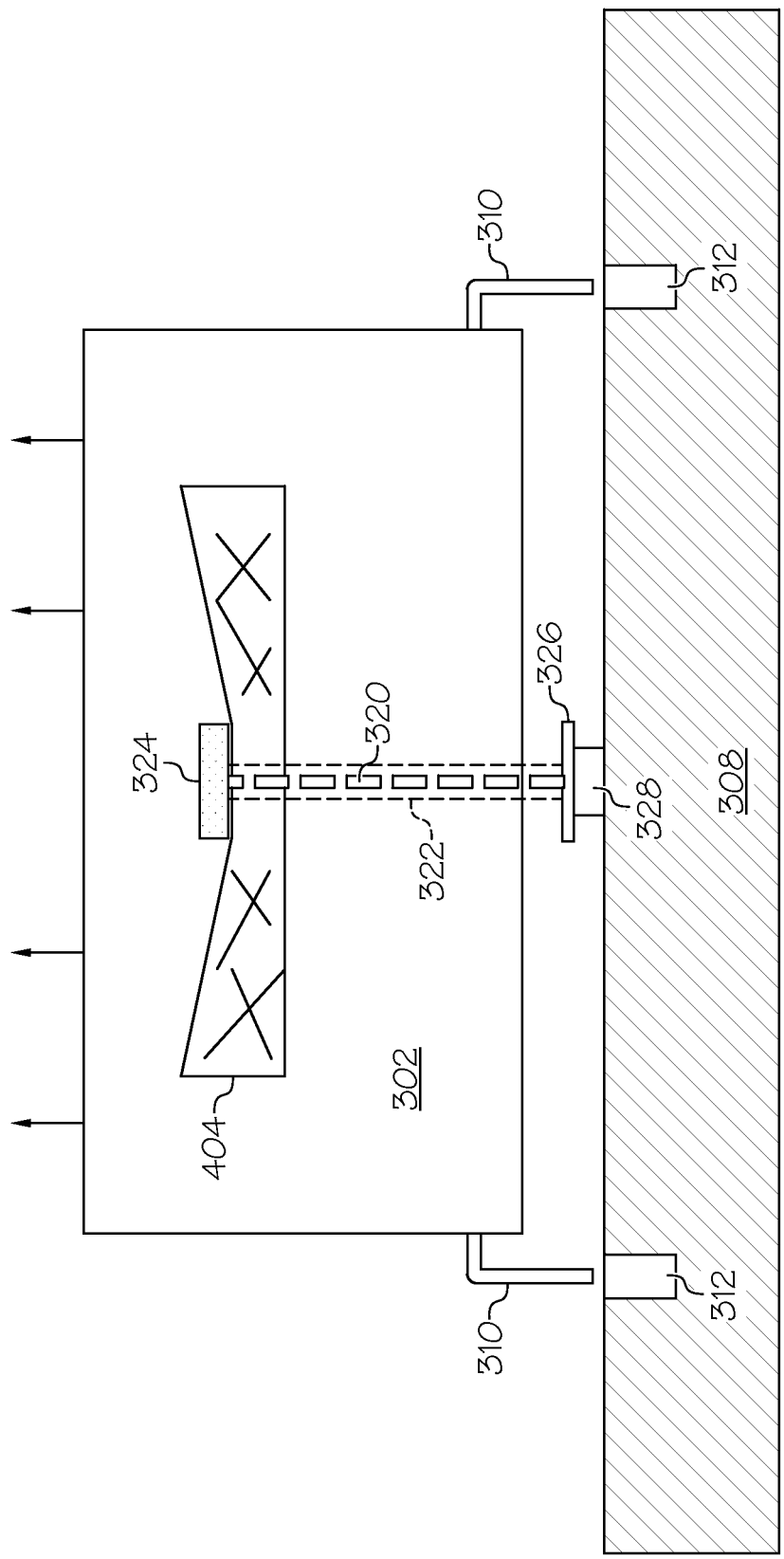
FIG. 4 illustrates the chip package in FIG. 3 after it has been removed from the circuit board.

As shown in FIG. 4, when the chip package 302 is physically removed from the circuit board 308, the post base 326 remains affixed to the circuit board 308 by the adhesive 328. The physical/mechanical movement of the chip package 302 causes the post cap 324 to be pulled through functional components of the IC substrate 404, which is now destroyed (i.e., is physically damaged to the point that it is no longer able to be used at all). If the IC substrate 404 was a memory, then this physical destruction ensures that the data that was once stored thereon can never be recovered. Similarly, if the IC substrate 404 was a processor, the physical destruction of the processor ensures that the processor will never again be functional, since it is now reduced to broken pieces.

Thus, FIG. 3 and FIG. 4 depict a chip package that contains an IC substrate (initially IC substrate 304 in FIG. 3 and subsequently destroyed IC substrate 404 in FIG. 4). The IC substrate comprises at least one electronic device, such as a memory cell, a transistor, a diode, a resistor, a capacitor, an internal connection wiring, etc.

A disabling post assembly comprises a post cap (e.g., post cap 324); a post (e.g., post 320) connected to the post cap, wherein the post cap is connected to a first end of the post, wherein the post traverses through a post channel (e.g., post channel 322) in the IC substrate, and wherein the post cap is initially positioned above the IC substrate. (Note that terms such as "above" and "below" are not intended to connote altitude, but rather are used vernacularly to describe the relative positions depicted in the figures.)

As shown in FIG. 3 and FIG. 4, a post base (e.g., post base 326) is connected to a second end of the post, wherein the post base is connected to a surface of a circuit board (e.g., circuit board 308) to which the chip package is electrically connected (e.g., via pins 310 mating with socket holes 312), wherein the post cap is physically pulled through the IC substrate while the chip package is subsequently removed from the circuit board, and wherein removing the chip package causes the post cap to physically destroy the IC substrate. The IC substrate may be a processor, a memory, or any other IC device.

Figure 5:
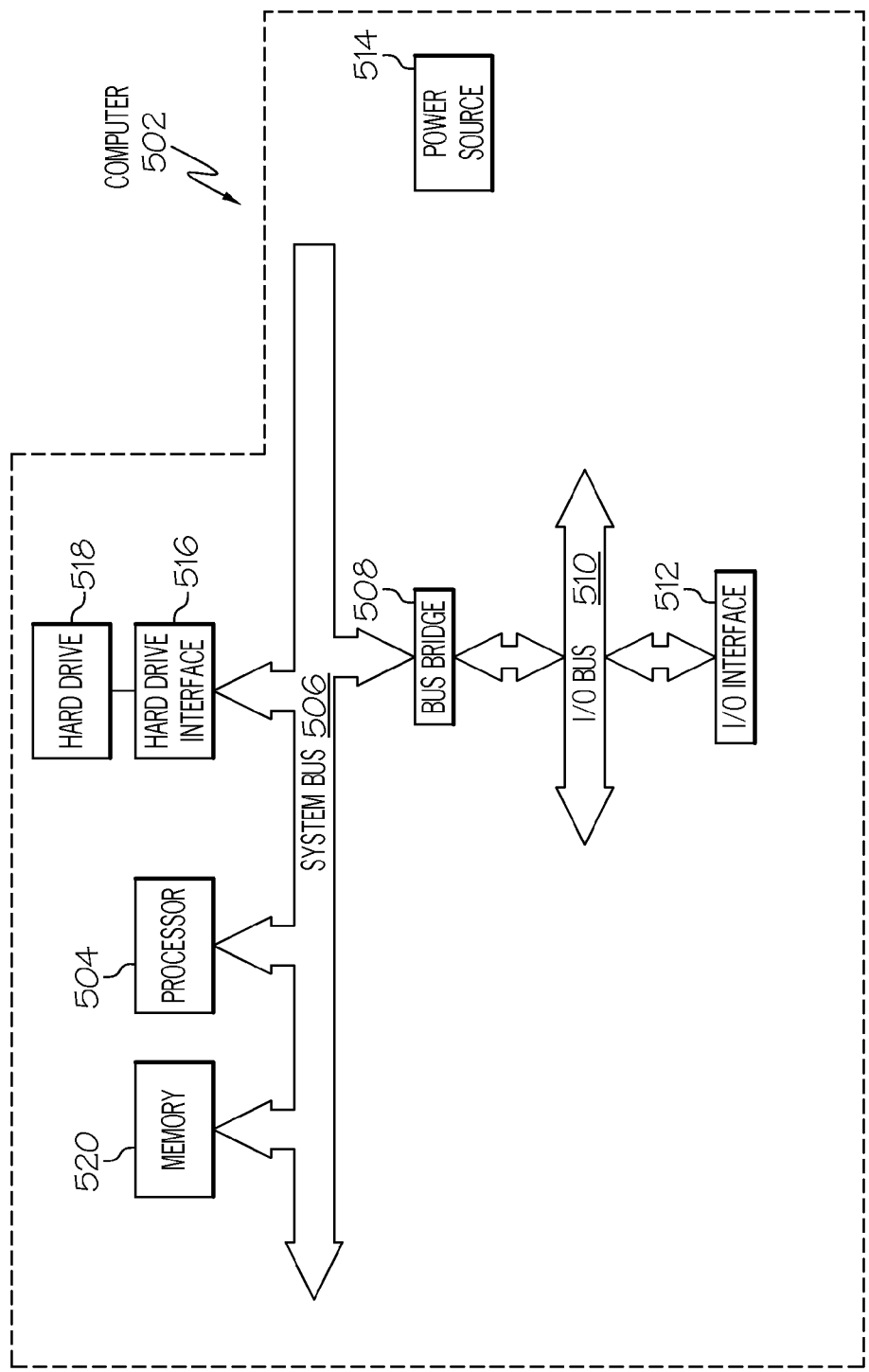
FIG. 5 depicts an exemplary computer in which the presently described chip packages may be utilized.

With reference now to FIG. 5, there is depicted a block diagram of an exemplary computer 502 in which the presently-described chip packages may be utilized. In the context of the present invention, chip packages 102/302 that may be permanently disabled as described herein may be the processor 504 and/or the memory 520 depicted in FIG. 5 and/or any other chip package coupled to a circuit board within computer 502.

Exemplary computer 502 includes processor 504 that is coupled to a system bus 506. Processor 504 may utilize one or more processors, each of which has one or more processor cores. System bus 506 is coupled via a bus bridge 508 to an input/output (I/O) bus 510. An I/O interface 512 is coupled to I/O bus 510. I/O interface 512 affords communication with various I/O devices via various ports (not shown). While the format of the ports connected to I/O interface 512 may be any known to those skilled in the art of computer architecture, in one embodiment some or all of these ports are universal serial bus (USB) ports. Power is supplied to computer 502 by a power source 514, which may incorporate an AC/DC converter to provide the requisite DC power needed by components of the computer 502.

A hard drive interface 516 is also coupled to system bus 506. Hard drive interface 516 interfaces with a hard drive 518. In one embodiment, hard drive 518 populates a system memory, such as memory 520. Memory 520 may be any IC device capable of storing data, including but not limited to single in-line memory modules (SIMMS), dual in-line memory modules (DIMMS), erasable programmable read-only memory (EPROM), electrically erasable read-only memory (EEPROM), volatile random access memory (RAM), etc.

Note that the hardware elements depicted in computer 502 are not intended to be exhaustive, but rather are representative to highlight essential components required by the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described embodiments of the invention of the present application in detail and by reference to illustrative embodiments thereof, it will be apparent that modifications and variations are possible without departing from the scope of the invention defined in the appended claims.

What is claimed is:

1. A chip package comprising:
an IC substrate, wherein the IC substrate comprises at least one electronic device;
a photovoltaic cell, wherein the photovoltaic cell generates an electrical current when exposed to light;
a light blocking shield, wherein the light blocking shield prevents light from striking the photovoltaic cell only while the chip package is mounted on a circuit board, and wherein the light blocking shield ceases to prevent light from striking the photovoltaic cell upon the chip package being dismounted from the circuit board; and
a disabling logic, wherein the electrical current, which is generated by the photovoltaic cell in response to the chip package being dismounted from the circuit board, causes the disabling logic to disable the IC substrate.

2. The chip package of claim 1, wherein the IC substrate is an electrically erasable programmable read only memory (EEPROM), and wherein the chip package further comprises:
a memory erasing logic, wherein the memory erasing logic sets a protection bit in the EEPROM, wherein the protection bit, upon the chip package subsequently being powered up after being dismounted from the circuit board, directs the EEPROM to be erased.

3. The chip package of claim 1, wherein the IC substrate is a processor, and wherein the chip package further comprises:
a system disabling logic, wherein the system disabling logic prevents the processor from operating.

4. The chip package of claim 3, wherein the system disabling logic is a power switch to the processor.

5. The chip package of claim 3, wherein the system disabling logic drives a voltage spike through the processor, wherein the voltage spike permanently disables the processor by permanently damaging circuitry within the processor.

6. The chip package of claim 3, wherein the IC substrate is a memory, and wherein the system disabling logic drives a voltage spike through the memory, wherein the voltage spike permanently disables the memory by permanently damaging circuitry within the memory.

7. The chip package of claim 1, wherein the light blocking shield is a cap mounted to the circuit board, and wherein the cap remains mounted on the circuit board upon the chip package being dismounted from the circuit board.

8. The chip package of claim 1, wherein the light blocking shield is created by a close proximity of the chip package to the circuit board while the chip package is mounted on the circuit board.

9. A computer system comprising:
a system bus;
a chip package electrically coupled to the system bus, wherein the chip package comprises:
an IC substrate, wherein the IC substrate comprises at least one electronic device;
a photovoltaic cell, wherein the photovoltaic cell generates an electrical current when exposed to light;
a light blocking shield, wherein the light blocking shield prevents light from striking the photovoltaic cell only while the chip package is mounted on a circuit board, and wherein the light blocking shield ceases to prevent light from striking the photovoltaic cell upon the chip package being dismounted from the circuit board; and
a disabling logic, wherein the electrical current, which is generated by the photovoltaic cell in response to the chip package being dismounted from the circuit board, causes the disabling logic to disable the IC substrate.

10. The computer system of claim 9, wherein the IC substrate is an electrically erasable programmable read only memory (EEPROM), and wherein the chip package further comprises:
a memory erasing logic, wherein the memory erasing logic sets a protection bit in the EEPROM, wherein the protection bit, upon the chip package subsequently being powered up after being dismounted from the circuit board, directs the EEPROM to be erased.

11. The computer system of claim 9, wherein the IC substrate is a processor, and wherein the chip package further comprises:
a system disabling logic, wherein the system disabling logic prevents the processor from operating.

12. The computer system of claim 11, wherein the system disabling logic is a power switch with the processor.

13. The computer system of claim 11, wherein the system disabling logic drives a voltage spike through the processor, wherein the voltage spike permanently disables the processor by permanently damaging circuitry within the processor.

14. The computer system of claim 11, wherein the IC substrate is a memory, and wherein the system disabling logic drives a voltage spike through the memory, wherein the voltage spike permanently disables the memory by permanently damaging circuitry within the memory.

15. The computer system of claim 9, wherein the light blocking shield is a cap mounted to the circuit board, and wherein the cap remains mounted on the circuit board upon the chip package being dismounted from the circuit board.

16. The computer system of claim 9, wherein the light blocking shield is created by a close proximity of the chip package to the circuit board while the chip package is mounted on the circuit board.

17. A chip package comprising:
an IC substrate, wherein the IC substrate comprises at least one electronic device;
a disabling post assembly, wherein the disabling post assembly comprises:
a post cap;
a post connected to the post cap, wherein the post cap is connected to a first end of the post, wherein the post traverses through a post channel in the IC substrate, and wherein the post cap is initially positioned above the IC substrate;
a post base connected to a second end of the post, wherein the post base is connected to a surface of a circuit board to which the chip package is electrically connected, wherein the post cap is physically pulled through the IC substrate while the chip package is subsequently removed from the circuit board, and wherein removing the chip package causes the post cap to physically destroy the IC substrate.

18. The chip package of claim 17, wherein the post base is connected to the surface of the circuit board by an adhesive.

19. The chip package of claim 17, wherein the IC substrate is a processor.

20. The chip package of claim 17, wherein the IC substrate is a memory.

* * * * *